R. Shepard.
Tag Holder.
No. 44,666. Patented Oct. 11, 1864.

Witnesses
Jas. C. Strout
Lysander Hill

Inventor
Richard Shepard
By Somes, Brown & Co
his Attorneys

UNITED STATES PATENT OFFICE.

RICHARD SHEPARD, OF BROOKLYN, NEW YORK.

IMPROVEMENT IN TAG-HOLDERS FOR BALES, &c.

Specification forming part of Letters Patent No. 44,666, dated October 11, 1864; antedated March 17, 1864.

*To all whom it may concern:*

Be it known that I, RICHARD SHEPARD, of the city of Brooklyn, county of Kings, and State of New York, have invented a new and Improved Mode of Attaching Tags to Bales of Merchandise; and I do hereby declare that the following is a full and exact description thereof, reference being had to the accompanying drawings, and to the letters of reference marked thereon.

The difficulty of attaching tags to cotton or other bales of merchandise to represent the number of pounds, quality, stamp-duty, &c., so as to prevent their easy removal by accident or otherwise, is well known to cotton-dealers.

The object of my invention is to overcome this difficulty to a great extent, and also to facilitate the operation of attaching the tags to the bales.

Figure 1:
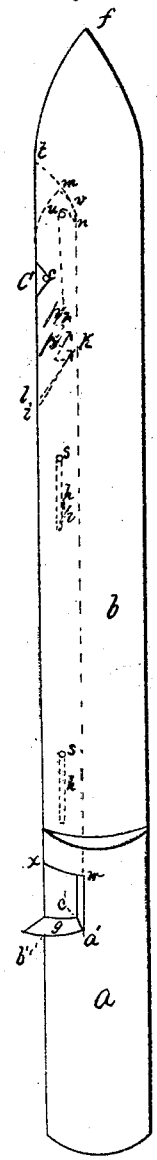
Figure 2:
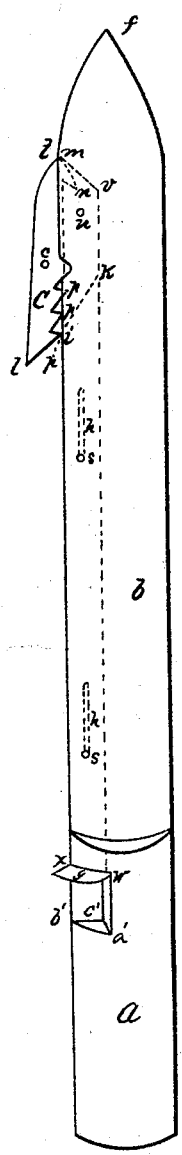
Figure 3:
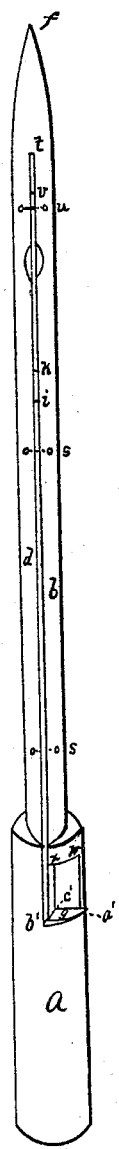
Figure 5:

Figures 1 and 2 show the side, and Fig. 3 the edge, of an instrument having a handle, $a$, and a blade, $b$, the latter of which is wide but thin and terminating in a sharp point, $f$. In this blade is a narrow but deep and long cavity, $t\, v\, w\, x$, into which fits closely the thin blade $g\, i\, k$ of the form shown in Fig. 5. The latter blade is held in position in the cavity of the former by rivets passing through the slots $h\, h$, and extends into the handle $a$, the solid part of which is cut away at $a'\, b'\, c'\, x\, w$ to allow it to be slid backward and forward in the cavity by means of the small thumb-handle $y$.

Figure 4:
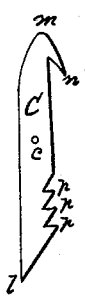

Fig. 4 represents a third blade, $c$, having a barb at $n$, teeth or barbs $p\, p\, p\, p$, and decreasing from $p$ to a sharp point, $l$. At $c$ is an aperture, through which passes a wire or chain, to which is attached the tag. This blade is not permanently attached to the instrument shown in Figs. 1, 2, 3.

I accomplish my object in the following manner: By means of the thumb-handle $g$ I draw the blade $d$ back the distance from $x$ to $b'$, as shown in Fig. 1, thus enlarging the cavity $t\, v\, k\, i$ sufficiently to receive the blade $c$, which I insert therein, as shown in Fig. 2. I now thrust the whole instrument into the bale. The blade $c$, being held in position by the barb $n$, catching upon a rivet shown at $u$ in Figs. 1 and 2, is carried to any required depth. When it has reached sufficient depth in the bale to firmly hold the tag, I slide the thumb-handle $g$ from $b'$ back to $x$, to the position shown in Fig. 2. The cavity $t\, v\, k\, i$ is diminished. The blade $g\, i\, k$ runs under the blade $c$, lifting the extremity at $l$ entirely out of the cavity where it had reposed and causing it to take the position shown in Fig. 2. Now, upon withdrawing the instrument from the bale by means of the handle $a$, the cotton or other substance of the bale catches in the point $l$ of the instrument $c$ and refuses to allow it to leave the bale, while the opposite end, $m$, of the blade $c$ slides easily up the incline plane $t\, v$ and allows the blade $c$ to become readily disengaged from the instrument and remain in the bale, where the sharp point $l$, together with the teeth $p\, p\, p\, p$ and the barb $n$, hold it permanently.

What I claim as my invention, and desire to secure by Letters Patent, is—

The blade $b$, in combination with the thin side $g\, i\, k$ and the instrument $c$, when operated as shown and described.

RICHARD SHEPARD.

Witnesses:
CHARLES S. WARD,
N. E. SHEPARD.